United States Patent Office 2,816,879
Patented Dec. 17, 1957

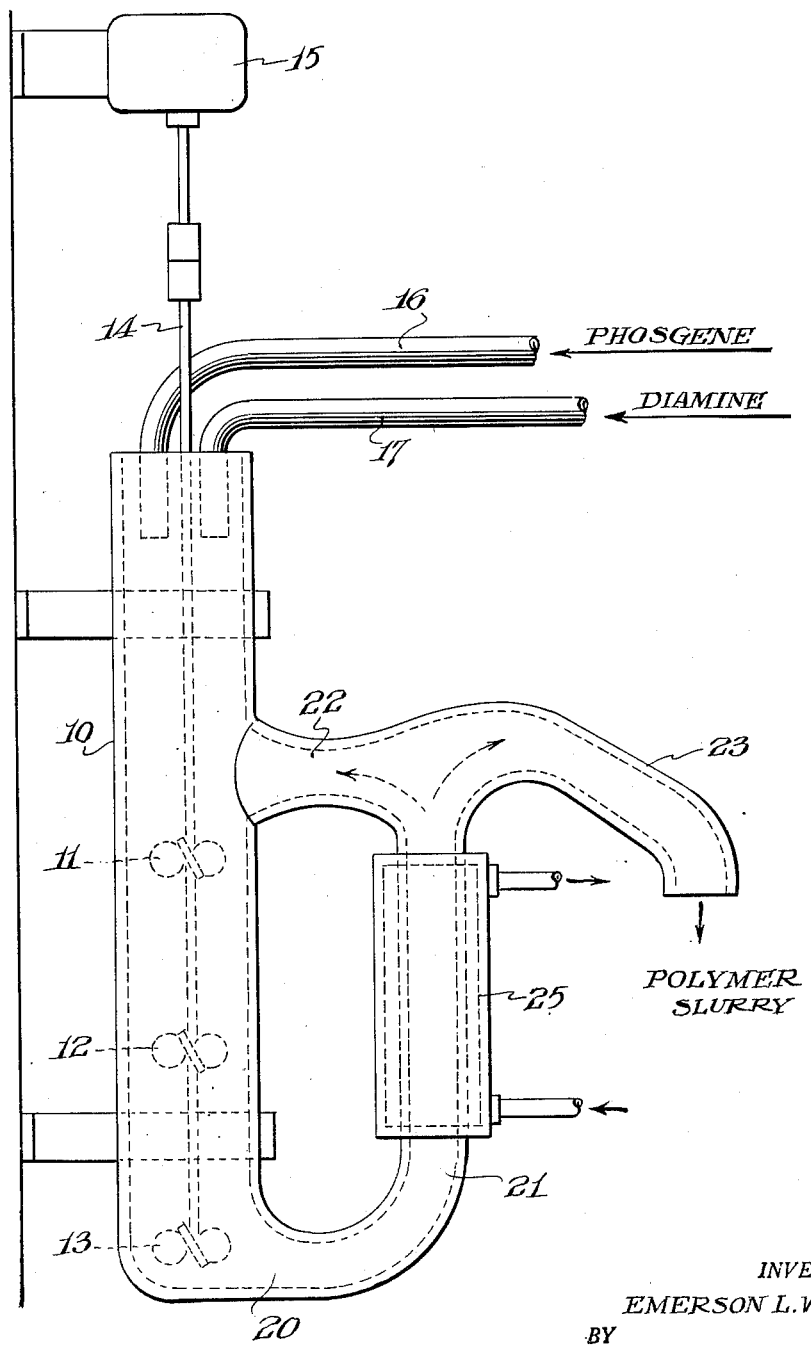

2,816,879
PROCESS FOR PREPARING POLYUREAS
UTILIZING IMMISCIBLE PHASES

Emerson L. Wittbecker, West Chester, Pa., assignor to E. I. du Pont de Nemours and Company, Wilmington, Del., a corporation of Delaware Application November 15, 1951, Serial No. 256,457

13 Claims. (Cl. 260—77.5)

This invention relates to the preparation of polyureas from organic diamines and phosgene and, more particularly, to a process for preparing fiber-forming polyureas by a moderate temperature interphase condensation polymerization.

It is well known that polyamides may be prepared by reacting, at amide-forming temperatures, organic diamines with organic dicarboxylic acids or amide-forming derivatives of these acids, such as their esters. Representative patents covering this field include Carothers' U. S. Patents 2,071,250, 2,071,253, 2,130,523, 2,130,948, and 2,190,770. These patents all disclose that the successful preparation of high molecular weight, fiber-forming polyamides is restricted to high temperature reactions in the range of 150° to 300° C., using pure reactants in substantially equivalent proportions.

Polyamides have also been prepared by the reaction of organic diamines with organic dicarboxylic acid chlorides at lower temperatures, the condensation being carried out with either the pure reactants or in an inert liquid diluent which is a mutual solvent for the reactants, such as benzene. However, these polyamides are of relatively low molecular weight and are, therefore, not useful in the textile field where polyamides normally find their greatest utility. The same is true when phosgene is used in place of a dicarboxylic acid chloride. Low molecular weight products result from this reaction even though acid acceptors, such as alkalies, carbonates, or tertiary organic bases, are present in the reaction medium. Only by subsequent heat treatment of these products, for example, at 200° to 250° C. under conditions permitting the rapid removal of volatile materials, has it been possible to prepare fiber-forming polyamides from these reactants. Consequently, the production of polyamides and polyureas from the dibasic acid halides has been considered to be impracticable.

Phosgene reacts with amine hydrochlorides readily to form one molecule of hydrogen chloride per amino group and a carbamic acid chloride. Condensation under reflux conditions will then accomplish the formation of a substituted urea from the carbamic acid chloride and another amino compound. Polyureas are also prepared by reacting diamines with diisocyanates, which are obtained by high temperature condensation of diamines with phosgene. Obviously, the preparation of useful, high molecular weight polyureas would be greatly simplified if a suitable process involving the direct condensation of diamines and phosgene could be devised.

It is an object of this invention to provide a process for producing fiber-forming polyureas by a reaction of organic diamines with phosgene or thiophosgene at moderate temperatures, without the necessity of subsequent heat treatment. It is a further object to provide such a process which has the advantages of using simple equipment and not requiring pure reactants or careful control of proportions. Another object is to provide such a process which is rapid, is readily practiced in continuous fashion, and produces a finely divided product. A still further object is to provide a process suitable for the production of polyureas which cannot be prepared at the high temperatures disclosed in the prior art either because of the instability of the reactants or the instability of the desired polyurea at these temperatures. Other objects will become apparent from the following disclosure and the claims.

It has now been found that the reaction or organic diamines selected from the group consisting of aliphatic primary and secondary diamines in which the reactive amino groups are separated by a linear chain of at least 4 atoms and basic aromatic primary and secondary diamines in which the shortest carbon chain connecting the reactive amino groups includes at least 3 carbon atoms of one ring, with a second compound selected from the group consisting of phosgene and thiophosgene proceeds smoothly and rapidly to the formation of fiber-forming polyureas or polythioureas at moderate temperatures when these reactants are brought together in such a way that the reaction zone is at, or is immediately adjacent to, a liquid-fluid interface and most of the molecules of at least one of the intermediates must diffuse through liquid diluent to arrive at the reaction zone. The process for accomplishing this comprises bringing together the diamine in a liquid phase and the phosgene or thiophosgene in a fluid phase immiscible with the first phase, mixing the phases to form a system comprised of two phases such that the diamine and phosgene or thiophosgene are in separate phases and at least one of the phases includes a liquid diluent, maintaining the phases in admixture until the desired condensation polymerization has taken place, and then if desired, separating the resulting polyurea. Preferably the diamine is a liquid under the reaction conditions or is dissolved in a diluent, but it may be a finely divided solid dispersed or suspended in a diluent in which it is at least partially soluble. Preferably the phosgene is present in a liquid phase under the reaction conditions, but spinnable polyureas can be prepared under suitable conditions by introducing gaseous phosgene into a solution of the diamine.

The drawing illustrates a suitable apparatus for carrying out the process in continuous fashion.

The above process may be carried out with a large number of variations, not all of which are equally adaptable to the preparation of each specific polyurea. The broad methods, falling within the purview of this new process and depicted in the examples hereinafter set forth, include the following: (1) non-aqueous systems in which at least one of the intermediates is dissolved or dispersed in a diluent or diluents such that at least two phases are obtained upon the initial mixing, and (2) aqueous systems in which the diamine is dissolved or dispersed in water, or water and another diluent, and in which the phosgene or thiophosgene is undiluted or is dissolved in a non-aqueous liquid diluent of such character that on mixing, a system of two phases is obtained initially. Throughout the remainder of the specification whenever phosgene is mentioned the equivalent thiophosgene is also intended.

It will be seen that the first broad method encompasses such variations as (a) a diamine dissolved or dispersed in a non-aqueous liquid diluent which is a non-solvent for phosgene and reacted with phosgene, (b) phosgene dissolved in a non-aqueous liquid diluent and reacted with a liquid diamine which is substantially insoluble in this non-aqueous liquid diluent, (c) a diamine dissolved or dispersed in a non-aqueous liquid diluent and reacted with phosgene dissolved in a non-aqueous liquid diluent such that the two non-aqueous diluents are immiscible, and (d) either a diamine or phosgene dissolved or dispersed in an emulsion of non-aqueous diluents and reacted with the other intermediate, which may be diluted with a non-aqueous diluent immiscible with one of the diluents for the first intermediate.

With respect to broad method Number (2), described above, it is seen that the following variations are included therein, (a) a diamine dissolved or dispersed in water and reacted with phosgene, (b) a diamine dissolved or dispersed in water and reacted with phosgene dissolved in a non-aqueous liquid diluent which is immiscible with water, and (c) a diamine dissolved or dispersed in an emulsion of water and non-aqueous diluent and reacted with phosgene, which may be diluted with a water-immiscible diluent.

For purposes of convenience, the polymerization process delineated in the paragraphs directly above shall hereinafter be called interphase polymerization. Furthermore, whenever a reactant is said to be "dispersed" in a diluent, in addition to the more usual meaning which encompasses the suspension of small discrete particles of solid or liquid in a diluent, this expression is intended to include cases in which the reactant is dissolved in a diluent, and "dispersion" is intended to include true solutions. While there is a technical difference between dispersions and true solutions, they are often difficult to distinguish and the two are equivalent in the practice of this invention.

The process for the preparation of polyureas by this interphase polymerization can be carried out over a considerable range of temperatures from just above the freezing point of the phase having the highest freezing point up to temperatures at which decomposition products form to an objectionable extent. However, in view of the rapidity with which fiber-forming polyureas are formed at moderate temperatures, there is no advantage in using temperatures higher than 100° C. and it is preferred that the reaction be carried out in the moderate temperature range of −10° C. to +60° C.

It is essential that the solvent or diluent employed for a specific reactant be inert toward it. It is not essential, however, that the solvent or diluent used in one phase be completely inert to the reactant in the other phase. Generally speaking, it is essential that the two reactants be more reactive toward each other than either reactant is to the solvent or diluent of the other phase. If this were not the case the yield of polyurea would be greatly reduced, or might even be non-existent.

Since the reaction rate of diamines with phosgene or thiophosgene is rapid at room temperature, it is preferable that the addition of the two phases containing the separate reactants be accompanied by sufficiently rapid stirring to produce an emulsion of fine particle size. Such emulsions may be equally well produced by other means, for example, by impinging two high velocity liquid streams upon each other in a suitable manner. When an emulsion of fine particle size is provided the available diamine and/or the phosgene is completely used up in a matter of a few seconds or, at most in a matter of a few minutes, depending to an extent on the sum total of the reaction conditions.

Fibers are prepared from some of the polyureas by spinning from a melt. The temperatures commonly employed for the production of melt-spun fibers are in the neighborhood of 200° to 300° C., and this may cause a further polyamidation reaction because the polymer chain still contains terminal amide-forming groups. When this occurs the molecular weight and melt viscosity both increase. Such changes in viscosity and molecular weight may constitute a serious problem in the preparation of uniform filaments. This can be overcome by treating the unstabilized polyurea with a mono-functional reactant, such as mono-amine or monoacid halide, and thus block off the remaining amide forming end groups to form a stabilized polymer. An alternative method is to employ a mono-functional amine or a mono-functional acid chloride as a stabilizer in the polyamide forming reaction of this invention. Small amounts of these monofunctional reactants, for example, from 0.1 to 5 mole percent, will enter into the reaction during the formation of polyurea chains and serve as non-reactive end-groups for these chains. Consequently, when such a polymer is subsequently heated for the purposes of melt spinning, neither the molecular weight nor the viscosity will increase, since there are no amide-forming terminal groups in the polyurea. Thus a melt-stable polyurea is obtained which has considerably more utility than the unstabilized material for this particular use.

Surprisingly, contrary to the teachings of the prior art, relatively impure reactants may be employed in the process of this invention. For example, the diamine may be grossly contaminated with a diamine carbonate, an impurity which is difficult to prevent. All manner of impurities which are non-reactive with either of the reactants under the conditions of this polymerization may be present without affecting the constitution or the purity of the resultant polyurea. Those impurities will not be a part of the polyureas produced and will either remain in the spent reaction liquor or, should they be insoluble in the diluents employed, they can be readily leached from the polyurea by simply percolating an appropriate solvent through a bed of the collected polyurea. If any impurity is valuable as a starting material for the preparation of a reactant, it can be recovered from the spent liquor and then be converted to the reactant for use in the process. In this way the efficiency of the over-all reaction can be improved for impure reactants and the cost of the final product correspondingly reduced. Mono-functional reactants of the type described above which serve as stabilizers are, of course not to be considered among the classes of impurities which can be tolerated in large amounts.

Another surprising feature of this invention which is contrary to the teachings of the prior art is that the reactants do not need to be employed in equivalent proportions. The excess of one reactant simply remains in the supernatant liquid from which the polyureas precipitate. It has been found that the process of interphase polymerization of diamines in which the reactive primary or secondary amino groups are separated by at least four atoms, with phosgene or thiophosgene yields polyureas of high molecular weight whether one reactant is in excess by 300% or even more, or whether the reactants are in equivalent or nearly equivalent amounts. For purposes of economy, it is usually desirable to employ the reactants in equivalent or nearly equivalent amounts.

The concentration of the reactants in the separate liquid phases can vary over wide limits and still produce high molecular weight polyureas. Either reactant, but not both, may be employed in 100% concentration as the pure compound. Likewise, either reactant may be employed in a very low concentration in its separate liquid phase, for example, concentrations as low as 0.1% or even lower are useful.

It is sometimes advantageous to employ an emulsifying agent to assist in suspending one liquid phase in the other. To this end, water or organic soluble emulsifying agents may be used. Examples of organic soluble agents are the "Spans" (Atlas Co., sorbitan mono fatty acid esters), the higher fatty alcohols, the higher fatty alcohol esters, "Naccolene F" (Allied Chem. & Dye Co., alkyl aryl sulfonate) "Acto 700" (Stanco Inc., sodium petroleum sulfonate), "Alkaterge C" (Commercial Solvents Corp., substituted oxazoline), "Betanols" (Beacon Co., high molecular weight esters) "Duponol OS" (Du Pont Co., higher alcohol derivative) etc.

Where one phase is aqueous, the emulsifying agents may be cationic, anionic or non-anionic. Representative examples of cationic emulsifying agents are "Lorol" pyridinium chloride ("Lorol" is the trade name for the mixture of aliphatic alcohols obtained by hydrogenation of coconut oil), "Triton K–60" (Rohm & Haas Co., cetyl dimethyl benzyl ammonium chloride) "Nopcogen 17L"

(Nopco Chem. Co., a hydroxylated polyamide). Representative examples of non-ionic agents are the "Tweens," (Atlas Co., polyoxyethylene derivatives of sorbitan monoesters of long-chain fatty acids) "Triton N–100" (Rohm & Haas Co., alkylated aryl polyether alcohol), the "Elvanols" (Du Pont Co., partially hydrolyzed polyvinyl acetates of various molecular weights), etc. and representative examples of the anionic emulsifying agents are soaps, the amine salts, "Duponol ME" (Du Pont Co., sodium "Lorol" sulfate), "Aerosol OT" (American Cyanamid Co., dioctyl ester of sodium sulfosuccinic acid), "Aresklene 400" (Monsanto Chemical Co., a dibutyl phenol sodium disulfonate) "MP–189S" (Du Pont Co., hydrocarbon sulfonate), etc.

It is likewise desirable to use an acid acceptor for the hydrogen halide which is liberated in the course of the reaction of the organic primary or secondary diamine with the phosgene. The diamine itself can serve as the acid acceptor by forming the amine salt. Since the amine salt is incapable of reacting with the carbamic acid chloride end of a growing polymer molecule at ordinary temperatures, it is desirable in this instance to start with at least 2 equivalents of diamine for every equivalent of phosgene to ensure that the polymerization reaction continues. To circumvent the necessity for using this large excess of diamine, it is necessary merely to add an acid acceptor, preferably to the liquid phase containing the diamine. When the amount of added acid acceptor is equivalent to the amount of liberated hydrogen halide, none of the diamine will be rendered unreactive. Larger amounts or lesser amounts of the added acid acceptor may be employed. The added acid acceptor may range from zero up to an amount equivalent to 5 times the diamine present or even more. Preferably, the added acid acceptor, if one is used, will be in the range of 1 to 2 times the amount equivalent to the diamine present. Preferably, the added acid acceptor should be a stronger base than the diamine contained in the same liquid phase so that the hydrogen halide reacts with the added acid acceptor preferentially. Depending on the basicity of the diamine, the added acid acceptor may be caustic alkali, an alkali carbonate or other salt of a strong base and a weak acid or a tertiary organic base.

These basic materials may be added directly to one of the liquid phases or sometimes to both the liquid phases either before or during the course of the reaction. Or, if these basic materials are not added at this stage, they may be added to the spent reaction liquor as a means of reforming the diamine from the diamine hydrohalide, so that the diamine may be put through the reaction again. The liquid phase containing the diamine can be strongly alkaline and still not prevent the preferential reaction of the phosgene with the diamine.

It is sometimes desirable to load the solvent for the respective reactants with non-reactive solutes so as to produce, for example, a better yield, or a higher molecular weight, or a more useful polyurea. Such non-reactive substances may be salts such as sodium chloride potassium bromide, lithium sulphate and the like for loading the aqueous phase.

Copolyureas are prepared by substantially the same procedure as homopolyureas by the process of this invention. Where the reactants are one diamine and phosgene, a homopolyurea results. Where the reactants are two or more diamines and phosgene or a mixture of phosgene and thiophosgene and one or more diamines, copolyureas are produced having compositions which depend on the ratios and reactivities of the intermediates.

The following examples illustrate preferred methods of practicing the invention and the effect of variations of operating conditions on the products obtained and the yields, but are not to be construed as limiting the scope of the invention. In these examples the inherent viscosity values of the products are given as an indication of the degree of polymerization obtained. In view of the relative ease with which these values are determined, they provide a useful method of evaluating the effect of process variables on a given type of polymerization. The values may be misleading when used to compare different types of polyureas but, in general, those having values of at least about 0.3 in m-cresol or 0.2 in concentrated sulfuric acid were spinnable. In determining these values, viscosimeter flow times were obtained at 25.0°±0.1° C. for a solvent of the polyurea and for a solution of the polyurea in the solvent at a concentration of 0.5 gram per 100 cubic centimeters of solution. The inherent viscosity value was then calculated as 2 times the natural logarithm of the relative viscosity of the solution compared to that of the pure solvent.

*Example 1*

In a Waring blendor with high speed stirring, an emulsion comprising 132 parts of benzene, 150 parts of water, 4 parts of sodium hydroxide, 1.5 parts of "Duponol" ME, and 5.8 parts of hexamethylenediamine was prepared. The emulsion was cooled to 10° C. and maintained at this temperature during the addition of 5.2 parts of phosgene dissolved in 20 parts of benzene. The mixture was stirred for 10 to 15 minutes after complete addition which required 1 to 2 minutes. After the stirring was stopped, the polymer and benzene separated from the mixture as a curdy material. The mixture was boiled until all the benzene was removed, and then filtered. The polymer product was washed with water and dried in air overnight. It was given a final drying treatment in a vacuum oven for one hour at 80° C. A yield of 7 parts of a spinnable polyhexamethyleneurea, having an inherent viscosity of 0.55 in metacresol, was obtained. The polyurea was melt-pressed at 260° C. into a clear film.

*Example 2*

In this experiment, gaseous phosgene was bubbled into the stirred emulsion of Example 1 until the emulsion became acidic. The polyurea obtained was recovered in similar fashion and found to have an inherent viscosity of 0.26 in metacresol.

*Example 3*

The experiment described in Example 1 was repeated in its entirety using carbon tetrachloride in place of benzene. The polyurea product was spinnable and had an inherent viscosity of 0.35 in metacresol.

*Example 4*

A solution of 5.8 parts of hexamethylenediamine and 4 parts of sodium hydroxide in 70 parts of water was added to a solution of 4.95 parts of phosgene in 320 parts of carbon tetrachloride. The mixture was stirred manually during the addition of the diamine solution. The polyhexamethyleneurea formed rapidly and the temperature of the mixture rose from room temperature to 45° C. A yield of 5 parts of a spinnable polyurea having an inherent viscosity of 0.93 in metacresol was obtained.

*Example 5*

A solution of 5.8 parts of hexamethylenediamine, 4 parts of sodium hydroxide and 1 part of "Duponol" ME in 70 parts of water was prepared and added to 4.95 parts of phosgene dissolved in 320 parts of carbon tetrachloride with manual stirring. Seven parts of a spinnable polyhexamethyleneurea having an inherent viscosity of 0.36 in metacresol were obtained. Thus, the mere addition of "Duponol" ME to the formula and technique of Example 4 led to improved yield of polymer which, however, had a much lower molecular weight. When this example was repeated with the added precaution of maintaining the temperature at 15° C. or below, the polyurea product obtained had an inherent viscosity of 0.43.

*Example 6*

Gaseous phosgene was bubbled into a solution of 5.8 parts of hexamethylenediamine and 4 parts of sodium hydroxide in 200 parts of water until the solution was neutral to Hydrion paper (Micro Essential Laboratory). The polyurea precipitated and was filtered. 4.2 parts of polymer having an inherent viscosity of 0.24 in concentrated sulfuric acid was obtained. In a repeat experiment in which the temperature was maintained below 15° C., a slightly higher yield, 4.6 parts of polymer, was obtained having an inherent viscosity of 0.36 in concentrated sulfuric acid. The latter polymer was melt-pressed into a clear flexible film at temperatures above 270° C. if the film pressing was done below this temperature, the resulting film was found to be brittle.

Example 7

A solution of 4.4 parts of tetramethylenediamine and 4 parts of sodium hydroxide in 70 parts of water was added to 4.95 parts of phosgene dissolved in 320 parts of carbon tetrachloride with manual stirring. The polymer formed rapidly and the temperature of the mixture rose to 45° C. A spinnable polytetramethyleneurea having an inherent viscosity of 0.24 in concentrated sulfuric acid was obtained. Similar success was achieved by using gaseous phosgene and keeping the temperature of the reacting mixture below 15° C.

Example 8

A solution of 6.6 parts of gamma, gamma' diaminopropyl ether and 4 parts of sodium hydroxide in 70 parts of water was added to 320 parts of carbon tetrachloride containing 4.95 parts of phosgene. The mixture was stirred manually during the addition of the diamine solution and the polyurea product precipitated rapidly as it formed. It was found to be spinnable and to have an inherent viscosity of 0.46 in concentrated sulfuric acid.

Example 9

A solution of 5.8 parts of hexamethylenediamine and 4 parts of sodium hydroxide in 70 parts of water was added to 5.75 parts of thiophosgene dissolved in 320 parts of carbon tetrachloride with manual stirring. When this technique did not lead to the precipitation of a polythiourea, the mixture was transferred to a Waring blendor and subjected to high speed agitation. In a few minutes, a sticky polymer separated. After no more precipitate appeared to form, the carbon tetrachloride was evaporated by heating the mixture. As the carbon tetrachloride distilled off, more polymer precipitated and when all of the carbon tetrachloride had been removed the polymer was found to be non-tacky. The polyhexamethylenethiourea had an inherent viscosity of 0.64 in metacresol. It was found to be manually spinnable and to possess a stick temperature of 135° C. A sample of the polymer was melt-pressed into a tan, flexible film at 150° C.

When benzene was used instead of carbon tetrachloride in the above experiment, a comparable polymeric product having an inherent viscosity of 0.49 was obtained.

The apparatus shown in the drawing may be used conveniently for continuous preparation of polyurea and polythiourea by the process of this invention. This apparatus comprises a glass reaction vessel 10 provided with an agitator comprising three-bladed propellers 11, 12 and 13 mounted on shaft 14 driven by motor 15. These propellers are located near the top, middle and bottom, respectively, of the vessel. The reactants are added in separate solutions at the top of the vessel directly above propeller 11 through pipes 16 and 17. A slurry of polymer and liquid is withdrawn from the bottom of the vessel through pipe 20, and passed upward through pipe 21, part of the slurry being recirculated to the top of vessel 10 through pipe 22. The remainder of the slurry is withdrawn through overflow pipe 23 and filtered to recover the polymer. The slurry may be cooled or heated during passage through pipe 21 by circulating fluid through jacket 25.

The classes of diamines which may be used in the process of this invention include the basic materials represented by the aliphatic primary and secondary diamines, including cycloaliphatic diamines, in which the reactive amino groups are separated by a linear chain of at least four atoms, and basic aromatic primary and secondary diamines, including aralkyl primary and secondary diamines, in which the shortest carbon chain connecting the reactive amino groups includes at least 3 carbon atoms of one ring. In addition to the diamines used in the examples, representative diamines of the above classes of reactants which can be used in accordance with this invention includes pentamethylenediamine, 2,5 - dimethylhexamethylenediamine, decamethylenediamine, bis-(N-aminoethyl)piperazine, N,N'-dimethylhexamethylenediamine, N-methylhexamethylenediamine, m- and p-phenylenediamines, 3,6-diaminodurene, benzidine, 2,3'-diaminodiphenyl, naphthalene diamines, p-aminobenzylamine, trans-1,4-diaminocyclohexane and hexahydroparaxylenediamine. Amino groups of very low basicity, such as N-aryl substituted aromatic amino groups do not respond in the process of this invention.

The advantages of the interphase polymerization process for polyureas over the methods previously described in the prior art are many and varied. By the method of this invention, polyureas which decompose at temperatures below their melting point may be easily and simply prepared with essentially no degradation products. Likewise, those polyureas which are normally prepared from reactants that decompose at the temperature normally employed may be produced simply and easily by the process of this invention. It is further seen that complicated or high strength equipment is not necessary for the process of this invention since the reaction is carried out preferably in the range including room temperature under atmospheric pressure. Additional advantages for this invention are that it is not necessary to employ high purity reactants to obtain a satisfactorily pure and high molecular weight polyurea and it is not necessary to maintain an exact equivalence of the reactants in the reacting mixture.

Importantly, the process of this invention for the production of polyureas yields the final product in an extremely short period of time after the reaction is initiated. As a result an enormous productivity can be achieved from relatively simple equipment occupying only a relatively small amount of floor space. Still another advantage is that the polyureas of this invention are obtained in a finely divided or granular state, which is easily dissolved for the purposes of wet spinning or dry spinning, and which is readily melted for the melt-spinning process disclosed for the polyureas of the prior art.

Another and important advantage of this invention is that it can be practiced in a continuous fashion. The streams of the two reactants in separate liquid phases can be brought together in equipment such as shown in the drawing, or the same end can be accomplished in many other ways. For example, liquid streams of the two reactants may be made to impinge upon each other at a high velocity so as to form an emulsion of fine droplet size. This emulsion need exist only for the very short time in which the reaction takes place. The resulting polyurea may then be separated from the spent reaction liquors. The advantages attributable to continuous processes are well appreciated in the chemical field.

Another important advantage of the invention is that polyurea dispersions can be prepared directly from the reactants. The dispersions can be used as prepared in the stable dispersed state in coating applications, or the dispersions can be broken when desired.

The polyureas produced by the process of this invention have utility in many and varied fields. They may serve as ingredients of coating compositions, they may be molded into useful plastic articles, they may be used for the production of fibers, filaments and films, and in

What is claimed is:

1. A process for preparing a polyurea which comprises bringing together in the presence of an acid acceptor for acid produced by the polymerizing complementary reactants, complementary reactants at a temperature within the range of −10° to +100° C., the one reactant comprising an organic diamine selected from the group consisting of aliphatic primary and secondary diamines in which the reactive amino groups are separated by a linear chain of at least 4 atoms and basic aromatic primary and secondary diamines in which the shortest carbon chain connecting the reactive amino groups includes at least three carbon atoms of one ring, the said organic diamine being the dispersed element of an aqueous dispersion, the second reactant comprising a compound selected from the group consisting of phosgene and thiophosgene, mixing the said reactants to form a multiphase system in which the diamine and the second reactant are in separate phases and maintaining the phases in admixture within the temperature range of −10° to +100° C. until an interphase condensation polymerization has taken place with formation of spinnable polyurea.

2. A process for preparing a polyurea which comprises bringing together in the presence of an acid acceptor for acid produced by the polymerizing complementary reactants, complementary reactants at a temperature within the range of −10° to +100° C., the one reactant comprising an organic diamine selected from the group consisting of aliphatic primary and secondary diamines in which the reactive amino groups are separated by a linear chain of at least 4 atoms and basic aromatic primary and secondary diamines in which the shortest carbon chain connecting the reactive amino groups includes at least three carbon atoms of one ring, the said organic diamine being the dispersed element of an aqueous dispersion, the second reactant comprising phosgene, mixing the said reactants to form a multiphase system in which the diamine and the second reactant are in separate phases and maintaining the phases in admixture within the temperature range of −10° to +100° C. until an interphase condensation polymerization has taken place with formation of a spinnable polyurea.

3. The process of claim 2 wherein the acid acceptor is a water-soluble base stronger than the said organic diamine and is added as a component of the aqueous dispersion of organic diamine.

4. The process of claim 2 wherein the aqueous dispersion containing organic diamine is present as an emulsion with a water-immiscible inert liquid diluent.

5. The process of claim 2 wherein the phosgene is dissolved in a water-immiscible inert liquid diluent.

6. The process of claim 3 wherein the phosgene is dissolved in a water-immiscible inert liquid diluent.

7. The process of claim 4 wherein the phosgene is dissolved in a water-immiscible inert liquid diluent.

8. A process for preparing a polyurea which comprises bringing together in the presence of an acid acceptor for acid produced by the polymerizing complementary reactants, complementary reactants at a temperature within the range of −10° to +100° C., the one reactant comprising an organic diamine selected from the group consisting of aliphatic primary and secondary diamines in which the reactive amino groups are separated by a linear chain of at least 4 atoms and basic aromatic primary and secondary diamines in which the shortest carbon chain connecting the reactive groups includes at least three carbon atoms of one ring, the said organic diamine being the dispersed element of an aqueous dispersion, the second reactant comprising thiophosgene, mixing the said reactants to form a multiphase system in which the diamine and the second reactant are in separate phases and maintaining the phases in admixture within the temperature range of −10° to +100° C. until an interphase condensation polymerization has taken place with formation of a spinnable polyurea.

9. The process of claim 8 wherein the acid acceptor is a water-soluble base stronger than the said organic diamine and is added as a component of the aqueous dispersion of organic diamine.

10. The process of claim 8 wherein the aqueous dispersion containing organic diamine is present as an emulsion with a water-immiscible inert liquid diluent.

11. The process of claim 8 wherein the thiophosgene is dissolved in a water-immiscible inert liquid diluent.

12. The process of claim 9 wherein the thiophosgene is dissolved in a water-immiscible inert liquid diluent.

13. The process of claim 10 wherein the thiophosgene is dissolved in a water-immiscible inert liquid diluent.

References Cited in the file of this patent

UNITED STATES PATENTS

| | | |
|---|---|---|
| 2,356,764 | Kern | Aug. 29, 1944 |
| 2,362,648 | Lichty et al. | Nov. 14, 1944 |
| 2,398,283 | Boon | Apr. 9, 1946 |
| 2,444,023 | Homeyer | June 29, 1948 |
| 2,566,717 | Carpenter et al. | Sept. 4, 1951 |
| 2,708,617 | Magat et al. | May 17, 1955 |

FOREIGN PATENTS

| | | |
|---|---|---|
| 461,237 | Great Britain | Feb. 9, 1937 |
| 534,699 | Great Britain | Mar. 14, 1941 |
| 892,361 | France | Jan. 7, 1944 |
| 904,939 | France | Mar. 26, 1945 |
| 895,395 | France | Apr. 3, 1944 |

OTHER REFERENCES

Marckwald: Ber. Deut., Chem., vol. 23, pages 3207 and 3208 (1890).

De Bell et al.: German Plastics Practice, pages 302 and 303 (1946).